(12) United States Patent
Van Brocklin et al.

(10) Patent No.: US 7,889,220 B2
(45) Date of Patent: Feb. 15, 2011

(54) DEVICE AND METHOD FOR MAINTAINING OPTICAL ENERGY DENSITY ON A MEDIUM

(75) Inventors: Andrew L. Van Brocklin, Corvallis, OR (US); Kuohua (Angus) Wu, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 960 days.

(21) Appl. No.: 11/555,184

(22) Filed: Oct. 31, 2006

(65) Prior Publication Data

US 2008/0101198 A1  May 1, 2008

(51) Int. Cl.
*B41J 2/435* (2006.01)
(52) U.S. Cl. ...................................... 347/224
(58) Field of Classification Search ................. 347/224, 347/225; 369/44.23, 112.23
See application file for complete search history.

(56) References Cited

U.S. PATENT DOCUMENTS

| | | | |
|---|---|---|---|
| 4,272,651 A | 6/1981 | Yoshida et al. | |
| 4,734,906 A | 3/1988 | Baer et al. | |
| 5,663,939 A | 9/1997 | Kase | |
| 6,301,059 B1 * | 10/2001 | Huang et al. | 359/668 |
| 6,370,092 B1 | 4/2002 | Araki et al. | |
| 6,430,136 B1 | 8/2002 | Gelbart | |
| 7,193,955 B2 * | 3/2007 | Ito et al. | 369/112.12 |
| 7,397,734 B2 * | 7/2008 | Martens et al. | 369/44.23 |
| 7,606,136 B2 * | 10/2009 | Kimura | 369/112.23 |
| 2005/0047286 A1 | 3/2005 | Hanks | |
| 2005/0047287 A1 | 3/2005 | Hanks | |
| 2005/0057639 A1 | 3/2005 | Van Brocklin et al. | |
| 2005/0058030 A1 | 3/2005 | Hanks et al. | |
| 2005/0058031 A1 | 3/2005 | Hanks | |
| 2005/0068412 A1 | 3/2005 | Anderson et al. | |

FOREIGN PATENT DOCUMENTS

| | | |
|---|---|---|
| GB | 2314197 | 12/1997 |
| JP | 11191237 A * | 7/1999 |
| WO | 2004/053855 | 6/2004 |

OTHER PUBLICATIONS

International Search Report issued Jun. 9, 2008; Internat'l Patent Application No. PCT/US2007/082841.

* cited by examiner

*Primary Examiner*—Hai C Pham

(57) ABSTRACT

A system and method are provided for maintaining optical energy density on a defined area of a medium markable by optical energy. The method includes the operation of directing a light beam from a light source to an optical system. The light beam can pass through at least one optical component in the optical system, where the optical system has astigmatic properties selected to maintain desired irradiance within the defined area of the medium through a range of working distances between the optical system and the defined area. A further operation is guiding the light beam by the optical system onto the marking area of the medium.

23 Claims, 4 Drawing Sheets

DEVICE AND METHOD FOR MAINTAINING OPTICAL ENERGY DENSITY ON A MEDIUM

BACKGROUND OF THE INVENTION

Optical disks represent a significant percentage of the market for data storage of photographic, video, audio and software data. Typically, optical disks have data patterns contained on the disk that can be read from one side of the disk and a graphic display printed on the other side of the disk. Various optical disk formats are available such as readable and writable CDs, DVDs, and other formats.

In order to identify the contents of the optical disk, printed patterns or graphic display information can be provided on the non-data side of the disk. The patterns or graphic display can be both decorative and provide information about the disk's data contents. In the past, commercial labeling has been routinely accomplished using screen-printing methods. While this method can provide label content, it tends to be cost ineffective for the production of less than about 400 disks because of the fixed costs associated with preparing a stencil or combination of stencils and printing the desired pattern or graphic display.

In recent years, the significant increase in the use of optical disks for data storage by consumers has increased the demand to provide customized labels for optical disks. Most consumer labeling methods include either handwritten descriptions or preprinted labels which may be affixed to the disk, but handwritten labels lack a professional appearance while affixed labels may adversely affect the disk performance upon spinning at high speeds.

Recently, a variety of radiation sensitive compositions have been developed for use on optical disks as disk labeling technology. In particular, disk labeling technology exists that can form text and/or graphics directly onto the label side of a CD or DVD using the optical drive's laser and a specially coated disk. The coating on a radiation sensitive disk layer can change color or chemical structure when the dye is exposed to the CD/DVD drive's laser. Accordingly, the disk surface specifically reacts to a particular wavelength emitted by the laser.

Forming an image onto a label side of a disk typically involves several components. These components include an optical print head that selectively outputs the laser light onto track locations on the disk surface to form the spots that make up the labeled image. In addition, a disk with a label side layer containing a radiation sensitive material layer is used. Software is used to manage the imaging process and determine which disk locations will be optically exposed.

Devices which may accept storage media, such as CD's or DVD's, often have a plurality of optical components, including an objective lens, which focus the light source onto the data side or label side of the disk. The objective lens is typically connected to a voice coil motor, which adjusts the position of the objective lens to achieve a desired focus or spot size on the storage medium. The size of a spot on the label side is determined, in part, by the size of the light source spot which can be focused onto the storage medium.

The optical components used for reading or writing to the disk media are costly to manufacture, particularly due to the expense of the voice coil motor used for adjusting the position of the objective lens. The cost of using a voice coil motor and related control circuits in an optical system is difficult to avoid because the optical medium surface is not perfectly smooth, which results in variable distances between the light source and the storage medium itself. While fixed focus system are less expensive due to the use of fewer parts, fixed focus optical systems have not been able to maintain energy focus on the storage medium as the distance between the light source and storage medium changes.

DETAILED DESCRIPTION

Figure 1:
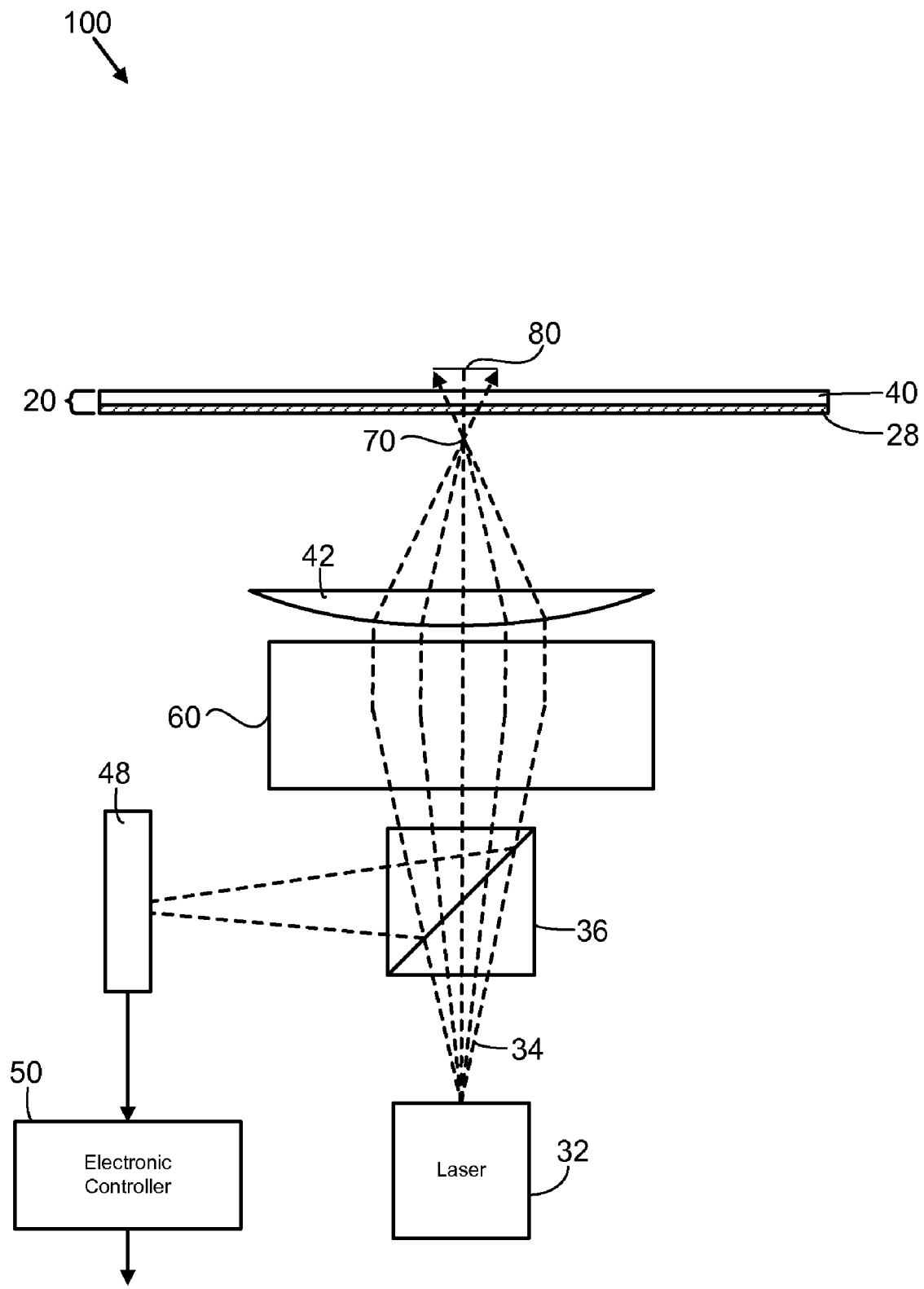
FIG. 1 is a schematic block diagram illustrating an embodiment of a storage medium drive optical path and control system for writing on an optical storage medium.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1 schematically illustrates one embodiment of a device for maintaining optical energy density in a marking area on a storage medium. A storage media drive optical path and control system 100 is provided for writing on and/or reading data from a storage medium 20 or optical disk such as a CD or a DVD. For the purpose of this disclosure, the term "medium" may refer to a single medium or media in the plural sense. The storage medium may have an optical disk layer 28 for data and a label layer 30. The label layer may contain radiation sensitive materials.

In order to write on and/or read data from the storage medium 20, a light source, such as a laser 32 is configured to emit a light beam toward the storage medium. The light source can be guided onto an area of the label layer 28 of the storage medium 20. This optical storage medium may have a data side 40 that can be read from when the disk is flipped over. The term light and light beam as used herein are defined to include electromagnetic waves within or outside of the visible spectrum. For example, the light source and light beams may be laser, infrared, ultraviolet, x-ray or other light.

While a laser 32 is depicted in the embodiment of FIG. 1, other embodiments may utilize alternative light sources, such as a high-power light emitting diode. A grating may be introduced into the optical path to create one or more spots which can be focused onto the storage medium 20. The embodiments described herein use one focused spot; however, it should be appreciated that diffractive optics for creating multiple spots could also be used.

The laser light 34 or light beam passes through one or more optical components 60 and the components are configured to modify or provide astigmatic properties for the optical system as the light passes through the components. The optical components can either add or remove astigmatism as needed to maintain a desired level of energy delivery or irradiance in a desired area or track on the label layer 30. In the present system and method, an objective lens 42 that is fixed relative to the other components in the optical system can be used to guide the light beam onto a marking area of the storage medium as the light beam is received from the plurality of optical components.

The distance between the objective lens and the storage medium varies by small amounts due to surface variations of the storage medium. This variation may be measured in increments of microns but the variations can be as large as millimeters. The distance the light travels between the objective lens relative to the label layer of the optical disk before creating an optical spot can be affected by variations in disc geometry due to factors such as disk warping, droop, waviness, and thickness variations.

Using the optical components to tune the astigmatism helps keep the irradiant energy or energy density from the laser source to a defined area on the storage medium within acceptable limits due to the specific amount of energy needed to change the state of the radiation sensitive material layer. It is also important not to exceed energy delivery limits and cause undesired effects. These effects may include discoloring, fading or excess optical density variation. The defined area may be sized to be substantially similar to a track size so that the optical disk tracking mechanism may be used. Alternatively, a more random type of locating device based on a grid can be used to move the laser source to the defined area.

Prior systems that do not utilize the astigmatism to increase working distance range will generally use an automatic focusing mechanism to account for the disk variations. Otherwise they will use a large substantially non-astigmatic spot to obtain a large working distance range. This large spot in turn leads to low resolution marking or data recording. The beam profile for prior systems with automatic focusing has been a beam profile that is similar to Gaussian with a slight amount of astigmatism. The Gaussian profile retains its shape as the working distance from the optical disk changes. This unchanging profile unfortunately has greater variation in the optical energy delivered to the radiation sensitive material layer on the optical disk as the working distance changes than the art described here. Thus, prior systems cannot use fixed optical print heads with fixed objective lenses for writing to radiation sensitive material layers and still retain the desired resolution, uniformity of mark optical density or other parameters related to uniform delivery of energy.

The astigmatism of the present system is increased or decreased in order to enable the astigmatic properties of the optical system to guide the light beam onto the storage medium and provide a spot that is oval in a first axis at one distance from the fixed laser 70. The same is also true of providing astigmatic guidance in a second axis of the light beam so that the spot formed by the light beam on the storage medium will be longitudinally oval at a second distance from the storage medium 80. For example, the first axis may be the called the x axis and be perpendicular to the axis of light propagation (the Z axis). And the second axis may be the perpendicular to both the X and Z axis. This means that that the system configuration using the modified astigmatism will have a substantially equivalent amount of energy delivered to a defined area or track on the storage medium regardless of the storage medium's distance from the laser. The energy delivery may be optimally uniform in an embodiment when the spot from the optical system is moving along a first direction, and the laser is turned on and off to define marks on the radiation sensitive material. In this case, the X and Y axis may be optimally at a 45 degree angle from the first direction.

There are a number of ways that the astigmatism of the system and method can be tuned. In one embodiment, the plurality of optical components 60 or optical lenses can be a first cylinder lens to adjust astigmatism in the first axis, which may be called the X axis. Then a second cylinder lens can be provided to adjust the astigmatism in a second axis, which may be the Y axis. The tuned astigmatism in different directions enables the system to maintain the same amount of energy to be focused within a track. In one embodiment, the directions may be perpendicular to one another but other orientations may be provided. Moreover, the use of an objective lens is not necessary in every embodiment. In certain cases as single lens element, toric or bi-asphere may be sufficient to both adjust the astigmatism and couple the energy from the laser to the media.

In another embodiment, the optical lenses can be a collimating lens and a cylinder lens to modify astigmatism in the optical system. A bi-aspheric lens may be used with the collimating lens or with the objective lens. A further combination for providing the tuned astigmatism can be a toric lens and an aspheric lens. Other lenses can be used that provide the desired modified astigmatism in the optical unit.

The use of astigmatism enables the use of an optical system with elements that are fixed relative to each other. A result of using a fixed component optical system is that the overall optical print head system includes less moving parts and focusing mechanisms are not used. When a mechanical device has a reduced number of moving parts, this decreases the likelihood of failure and increases the overall quality of the optical writing and reading device.

Figure 2:
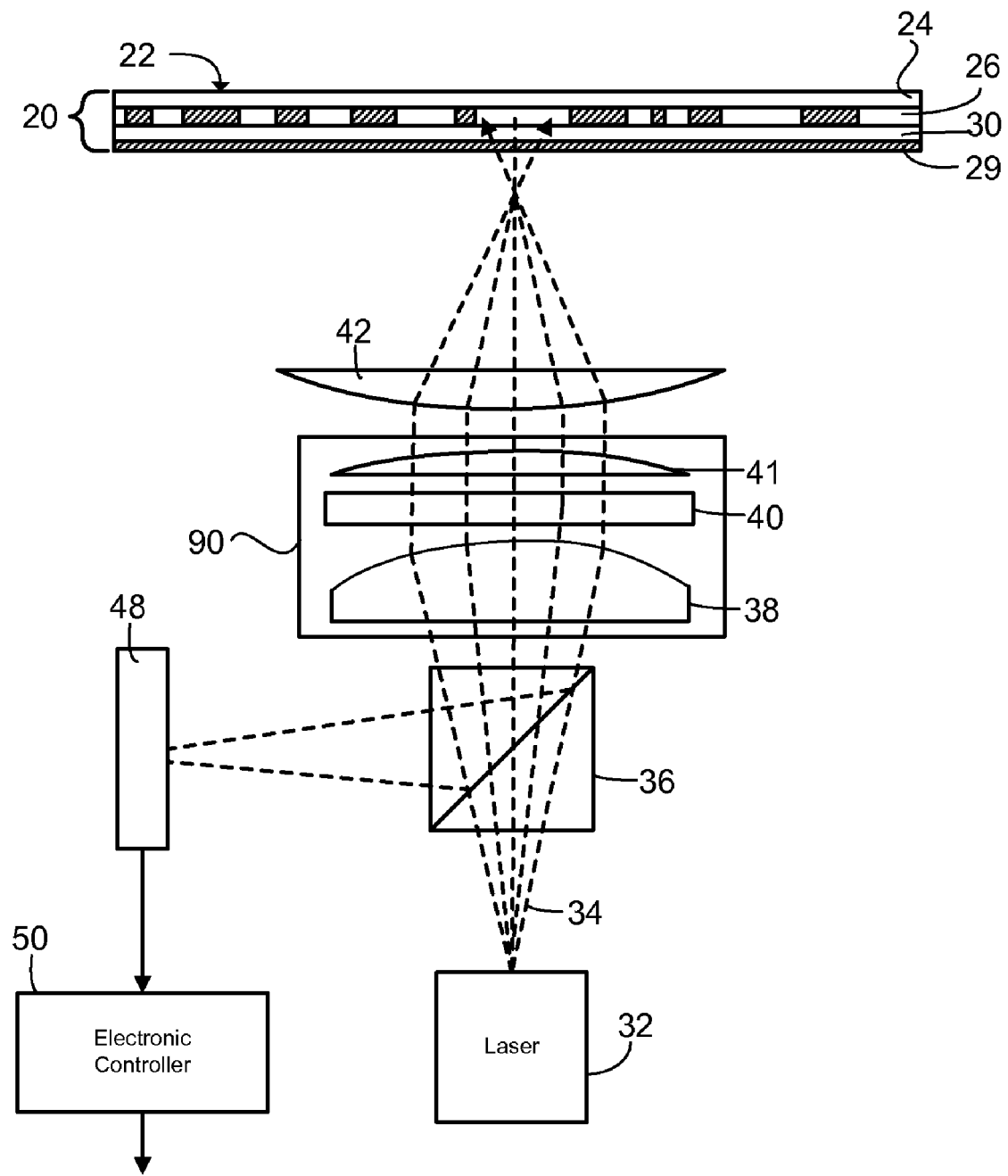
FIG. 2 is a schematic block diagram illustrating an embodiment of a storage medium drive optical path, a plurality of astigmatic lenses, and a control system for writing on an optical storage medium.

FIG. 2 illustrates an embodiment where the laser light 34 can pass through a polarizing beam splitter 36 and into a collimating lens 38. The collimated light may then make a first pass through a quarter wave plate 40, which changes the phase of the laser light by ninety degrees. The next optical element may be the aspheric lens 41 or bi-aspheric lens which can increase or decrease the amount of astigmatism. Other optical components 90 or combinations of lenses can be used in place of the aspheric lens, as described above. An objective lens 42 may guide the laser light onto marking layer of the optical medium 20. In this embodiment, the optical medium can have a substrate layer 30, a reflective data layer 26, a protective layer 24 and a label layer 29.

In the situation where the disk is flipped over and the data layer 26 is being read, varying amounts of laser light 34 may reflect off of the data layer 26 and back through the objective lens 42 depending on the reflectivity of the data layer 26. The laser light can pass through the quarter wave plate 40 going towards the disk, where the phase of the reflected light is rotated 45 degrees in a pass. The first pass through the quarter wave plate results in a 45 degree rotation in polarization. After the light is reflected from the media, it passes backwards through the quarter wave plate 40 and is rotated another 45 degrees. Then it passes through collimating lens 38 then it is 90 degrees out of phase in polarization from the original laser light 34. As a result, when this phase-shifted reflected light reaches the polarizing beam splitter 36, the light can be reflected onto a photo sensor 48.

The photo sensor can convert the light data into digital signals that are passed to the electronic controller 50. The controller may include analog circuitry, digital circuitry, an application specific integrated circuit (ASIC), a microprocessor, or any combination thereof The controller 50 may also be coupled to the laser 32 to control when the laser 32 is emitting light and at what intensity.

Since the present system and method do not need a focusing feedback loop, then the components for the feedback loop and other additional elements that are typically included in a focusing system may be removed. Examples of components that may not exist in the present embodiment include an astigmatic cylindrical lens for use with the photo sensor which is normally part of the focusing system. A fixed optical system, such as the present system and method, does not use a focus actuator (e.g., a voice coil) or its associated sensing circuitry. The controller can also be simplified because the controller's job becomes primarily data acquisition, and the controller and photo sensor do not need the typical focusing logic or components. Removal of these elements can reduce the overall system cost significantly.

Figure 3:
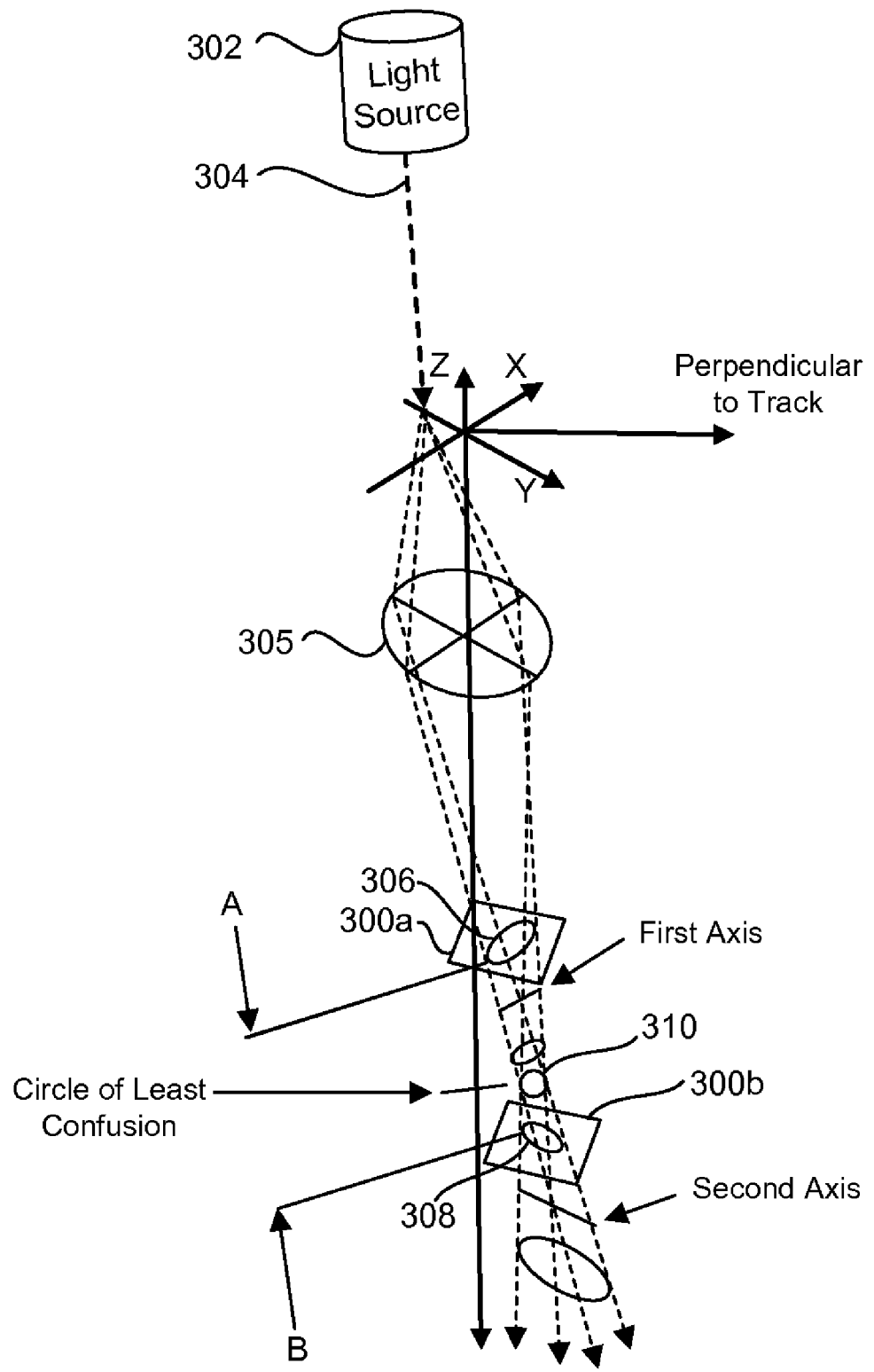
FIG. 3 is an perspective isometric view of spots formed on an optical storage medium in an embodiment of the invention.

FIG. 3 is an isometric perspective view of an optical storage medium 300a and 300b at two example distances and the related optical print head system that illustrates the desired astigmatic output patterns that aid in maintaining the desired high level of irradiance in a defined area of the marking layer. In an ideal world, a circle would be the shape that would most accurately concentrate the laser light within a track or area on the storage medium. However, when the optical disk or storage medium varies in height and/or distance from the light source, a Gaussian beam becomes gradually defocused in a fixed focus system. For example, when the optical disk surface is farther from the light source in a system without astigmatism, the circle may increase in size which can result in diffusion of the optical energy used to activate the radiation sensitive materials. This means the desired writing operations are likely to fail without the more expensive focusing components.

In contrast, the light beam 304 from the light source 302 may be guided using tuned astigmatism. The astigmatism for the optical system is added or modified by astigmatism tuning components 305 as previously described. The resulting optical spot can be oval in a first axis 306 when the optical disk 300a is closer to the light source. The optical spot may also be oriented in a second axis 308 as the optical disk is located at a more distant disk location 300b on the Z axis. The oval will change as the storage medium varies in height and/or distance from the light source as illustrated by in the range defined by A through B. At some points, the distance of the disk from the light source may actually arrive at the circle of least confusion 310. The astigmatic oval spots may also be oriented on the optical medium at approximately 30-50 degrees to the direction of disk travel. Other orientations to the disk's direction of travel can also be used while still maintaining the optical energy density in the track on the optical medium. The ovals spots can have the same amount of energy density in both the first axis direction and second axis direction.

In FIG. 3, the oval is illustrated as rotating in the clockwise direction. However, the oval may be rotated in the counter-clockwise direction as the optical surface's distance from the light source changes on the Z axis. It is valuable to have the oval rotate in a direction that maximizes the area on the label or optical disk track covered at any given point in time. This property can be maximized by optimization of the optical components that modify the astigmatism.

Instead of diffusing the energy as in the case of a Gaussian profile beam that does not have astigmatism, a substantially similar light energy of the described embodiments is contained within the track on the optical disk when the optical disk stays in the allowed range, closer or farther from the light source. This is because the material passing under the light source experiences a similar amount of cumulative energy exposure in the case when the working distance is such that the spot is oval with the major axis of the oval in the X direction, and when the working distance is such that the major axis of the oval is in the Y direction. In between these working distances, the spot on the optical disk will reach the circle of least confusion and this shape is also valuable for concentrating the desired optical energy onto the optical disk track.

The astigmatism of the present invention has been described using astigmatism on two axes. It is possible that astigmatism may be used in more than two axes. For example three, four or more axes could be used and additional optical components could be use to provide the additional axes.

Figure 4:
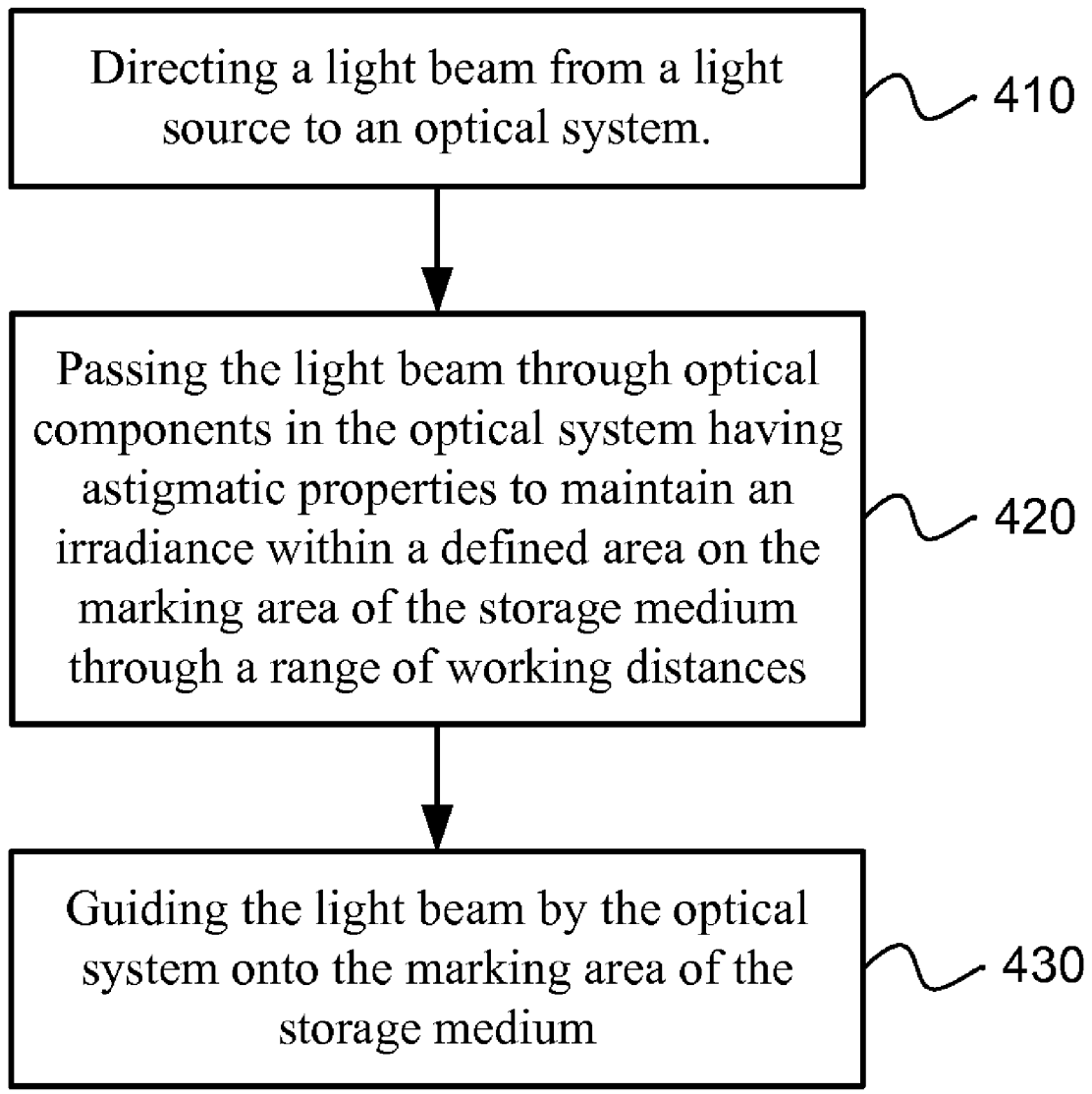
FIG. 4 is a flow chart illustrating a method of optical energy density on a storage medium an embodiment of the invention.

FIG. 4 is a flowchart illustrating a method of maintaining optical energy density on a marking area of a storage medium. The method can include the operation of directing a light beam from a light source to an optical system, as in block 410. As mentioned, the light beam can be generated by a laser or laser diode. The light beam may then be passed through at least one optical component in the optical system having selected astigmatic properties. This allows the system to maintain an irradiance within a defined area on the marking area of the storage medium through a range of working distances between the optical system and the marking surface, as in block 420. The astigmatism can be added, increased, or decreased in order to maintain a level of irradiance within a defined area on the storage medium.

The astigmatism aids in maintaining enough irradiance in a defined area or track on the marking layer of storage medium to enable the radiation sensitive material to change. If the irradiance expands outside the track, then the energy may be too diffuse to make any change to the radiation sensitive material or the dye may be changed in the wrong location. This irradiance or total laser light energy can be maintained despite the fact that there is a varying working distance between the light source and the marking layer of the storage medium. Another operation is guiding the light beam by the optical system onto the marking area of the storage medium, as in block 430.

Any number of optical lenses can be used to add, increase or decrease the astigmatism of the overall system and method. Many different lens combinations can be used to tune the astigmatism and deliver the desired astigmatic spot on the storage medium. For example, the lenses may be: a single toric lens, two cylinder lenses in perpendicular orientations, a collimating lens and a cylinder lens, aspheric lenses or bi-aspheric lenses. While the optical disk's distance from the fixed light source and fixed objective lens may vary, the present embodiment can focus irradiance within a track on the optical disk using the astigmatism described. The light source and object lens are fixed with respect to the optical system.

In a more detailed example embodiment of the invention, an optical print system can be provided that uses a laser diode with 0-25 μm of astigmatism at the entrance pupil. The laser diode will be described as having 15 μm in this example. This is expressed as the difference between the points at which the light diverging in the X meridian and diverging in the Y meridian light appear to originate from in the laser diode. Some inherent astigmatism results from the nature of the low cost laser diodes used in many optical systems capable of marking radiation sensitive material layers. However, the inherent astigmatism is mostly corrected or reduced through fractional magnification because of the spot shape problems it typically creates in ordinary systems. The astigmatism of the entire optical system plus source is expressed as a difference in the location of the system's object planes for the X and Y meridians. The present system and method does not correct for such inherent source astigmatism (unlike previous optical print heads) but modifies, increases, or decreases astigmatism. The transverse or conventional magnification of the optical print head may be about 5. This is the ratio of the image to object distances about the lens axis. The longitudinal (Z axis) magnification is the square of the transverse magnification or 25 in this example. This provides 25*15 µm=375 µm of magnification of the astigmatism present in the laser. This number is the difference in the Z axis (normal to the media surface) between the image plane in X and the image plane in Y.

The result is that the peak irradiance is reduced and what would be the best focus is now at the circle of least confusion. This circle is the point between the Z distance for the X best focus and the Y best focus. Without the astigmatism, the best focus would be around 8 µm Full-Width Half-Maximum (FWHM). With the astigmatism, the system provides a 26-29 µm FWHM in the X or horizontal direction that can be remarkably constant over a desired working distance tolerance. In this example, the X axis can be in the direction of the disk's radial direction.

The result of providing this modified amount of astigmatism is that as the optical disk moves toward or away from the optical system, the spot or beam shape changes from an ellipse with the major axis in X, to a circle (the circle of least confusion), and then to another ellipse with the major axis in the Y direction. This provides marking energy for the radiation sensitive material layer that is substantially constant over the transition range.

A system that includes tuned astigmatism provides a significant amount of tolerance to the working distance between the optical disk surface and the objective lens or optical system. In a prior system that has corrected for the astigmatism and uses automatic focusing, the tolerance for the working distance between the lens and the media may be less than ±200 µm. In contrast, the present embodiments can have over ±600 µm of tolerance, which is a several fold increase in tolerance.

The difference in tolerance is significant because a tolerance of ±600 µm allows the optical print head to use a fixed light source and object lens system. As a result, the system does not need a voice coil motor that is normally used with high NA (numerical aperture) optical pickup units. This cost savings can be on the order of a couple of dollars and that is very significant savings for products manufactured in quantities of hundreds of thousands.

In summary, the modification and/or addition of astigmatism into an optical system for maintaining optical energy density on a storage medium is helpful in reducing the cost of the optical system and reducing the number of components used in the optical system. Astigmatism is normally an aberration in an optical read/write heads that is nearly or totally corrected out of the system. In contrast, the present system uses astigmatism to solve the problem of maintaining optical energy in an optical disk track as the working distance changes between the optical disk and the optical system.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method of maintaining optical energy density on a defined area of a medium markable by optical energy, comprising:
    directing a light beam from a light source to an optical system having an objective lens that is fixed to at least one degree of freedom;
    passing the light beam through at least one optical component in the optical system, where the optical system has astigmatic properties selected to maintain a desired irradiance within the defined area through at least a 600 µm range of working distances between the optical system and the defined area; and
    guiding the light beam by the optical system onto the defined area.

2. A method as in claim 1, further comprising the step of providing at least two focal axes using the astigmatic properties of the optical system.

3. A method as in claim 1, further comprising the step of using the astigmatism properties of the optical system to maintain a high enough level of irradiance so as to change a radiation sensitive material on the defined area of the medium through the range of working distances between the optical system and the defined area.

4. A method as in claim 1, further comprising the step of increasing an existing amount of astigmatism in the optical system.

5. A method as in claim 1, further comprising the step of reducing an existing amount of astigmatism in the optical system.

6. A method as in claim 1, further comprising the step of using a first lens in the optical system to adjust astigmatism in a first axis and a second lens in the optical system to adjust astigmatism in a second axis.

7. A method as in claim 1, further comprising the step of using a collimating lens and cylinder lens in order to modify the astigmatic properties of the optical system.

8. A method as in claim 1, wherein the optical system includes at least two optical components that arc each fixed relative to the other.

9. A method of claim 1, further comprising the step of forming astigmatic oval spots on the defined area of the medium, where each oval spot has separate major axes.

10. A method as in claim 9, further comprising the step of orienting the astigmatic oval spots at approximately 45 degrees to a direction of travel for the medium.

11. The method of claim 1, wherein the light beam forms within the defined area a spot oval in a first axis at one endpoint of the range and the spot oval in a second axis at the other endpoint of the range.

12. The method of claim 11, wherein the spot is circular at an intermediate point in the range.

13. The method of claim 1, wherein the desired irradiance is maintained within the defined area through at least a 1200 µm range of working distances between the optical system and the defined area.

14. A device for maintaining optical energy density on a marking area of a medium markable by optical energy, comprising:
    a light source configured to emit a light beam from the light source to an optical system;
    the optical system configured to guide the light beam onto the marking area;
    where the optical system comprises at least one optical component in the optical system through which the light beam is passed, the at least one optical component including a toric lens and an aspheric lens; and where the at least optical component has astigmatic properties that maintain a desired optical energy density on the marking area through at least a 600 μm range of working distances between the optical system and the marking area.

15. A device as in claim 14, wherein the at least one optical component comprises a first cylinder lens to adjust astigmatism of the optical system in a first axis and a second cylinder lens to adjust astigmatism in a second axis.

16. A device as in claim 14, wherein the at least one optical component further comprises:
    a collimating lens; and
    a cylinder lens acting with the collimating lens in order to modify astigmatism of the optical system.

17. A device as in claim 14, wherein the at least one optical component further comprises a bi-aspheric lens used in combination with an objective lens.

18. A device as in claim 14, wherein the at least one optical component further comprises a collimating lens and a bi-aspheric lens.

19. The device of claim 14, wherein the desired optical energy density is maintained on the marking area through at least a 1200 μm range of working distances between the optical system and the defined area.

20. A device for maintaining optical energy density on a marking area of a medium markable by optical energy, comprising:
    a light source configured to emit a light beam from the light source to an optical system;
    the optical system configured to guide the light beam onto the marking area;
    where the optical system comprises at least one optical component in the optical system through which the light beam is passed and a fixed objective lens configured to guide the light beam onto the marking area of the medium as the light beam is received from the at least one optical component; and
    where the at least optical component has astigmatic properties that maintain a desired optical energy density on the marking area through at least a 600 μm range of working distances between the optical system and the marking area.

21. A device for maintaining optical energy density on a marking area of a medium markable by optical energy, comprising:
    a light source configured to emit a light beam from the light source to an optical system;
    the optical system configured to guide the light beam onto the marking area;
    where the optical system comprises at least one optical component in the optical system through which the light beam is passed;
    where the at least optical component has astigmatic properties that maintain a desired optical energy density on the marking area through at least a 600 μm range of working distances between the optical system and the marking area; and
    wherein the light source and the objective lens are fixed within the device.

22. A method of maintaining optical energy density on a marking area of an optical disk, comprising:
    directing a light beam from a light source to an optical system;
    passing the light beam from the light source through an optical component in the optical system having astigmatic properties that maintain a desired irradiance within a track on the optical disk at a working distance between the optical system and the optical disk that has a tolerance of at least +/−300 μm; and
    guiding the light beam by the optical system onto a track of the optical disk using an objective lens fixed with respect to the optical system.

23. The method of claim 22, wherein the desired irradiance is maintained within the track at a working distance that has a tolerance of at least +/−600 μm.

* * * * *